United States Patent Office 2,994,176
Patented Aug. 1, 1961

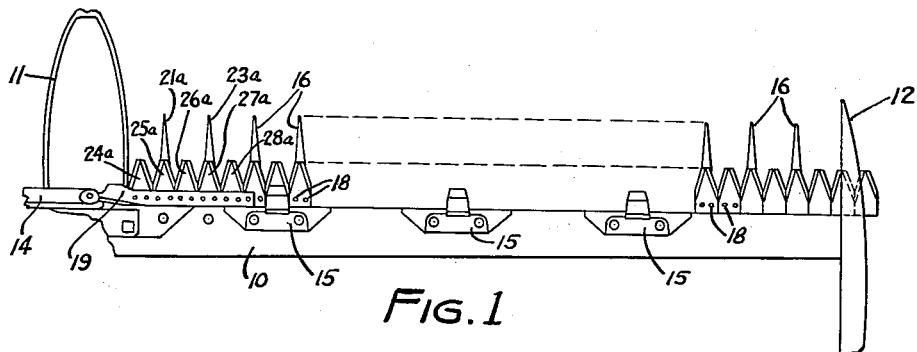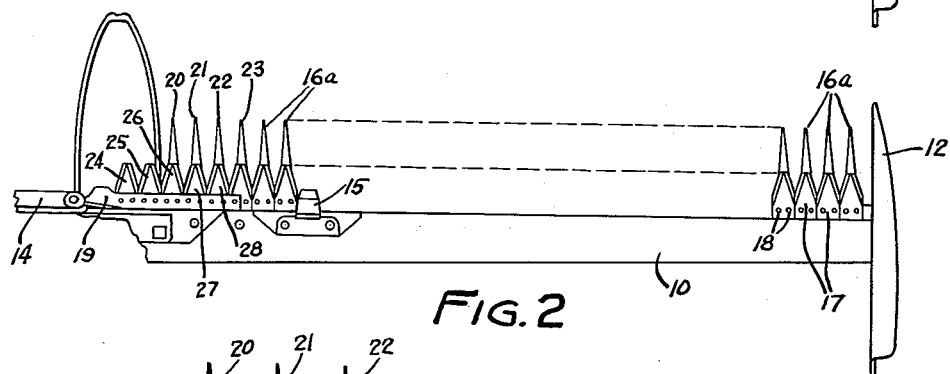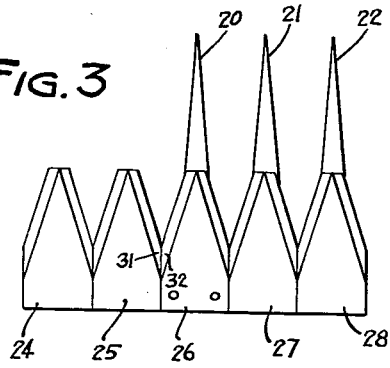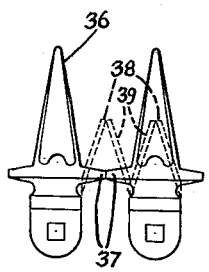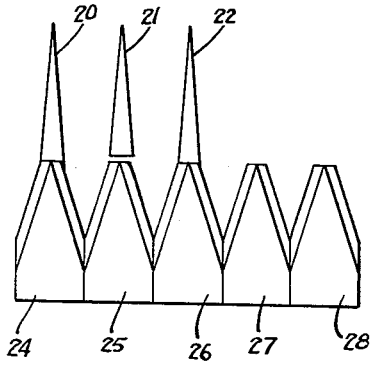
INVENTORS
CLARK E. STROBURG
BY HUBERT H. HENRY
Moore, White & Burd
ATTORNEYS

2,994,176
MOWER CUTTER BAR AND KNIFE ASSEMBLY
Clark E. Stroburg, Blockton, Iowa, and Hubert H. Henry, Bedford, Iowa
Filed July 15, 1959, Ser. No. 827,211
3 Claims. (Cl. 56—298)

This invention is a novel cutter bar and knife assembly for mowing machines that is novel chiefly in that the knife sections are only one half as wide as the three inch wide, mowing maching knife sections of the common mowing machine. A still further structural feature of the invention requires as many as may be of the sections of this invention to have their points positioned in relation to the sickle bar, the same as those of the sections previously provided with alternate sections interposed.

A problem that has plagued users of mowing machines from their inception has been the clogging of these machines by having pieces of agricultural material being mowed pulled into the machine and between the sections and ledger plates without shearing the material cleanly. This uncut material gradually accumulates until the mowing machine must be stopped and cleaned in order to operate effectively. Until now efforts to develop structure to prevent clogging have been aimed principally at preventing clogging of the outboard shoe, since this has been the most common source of trouble. It is true, nevertheless, that to a lesser extent the same problem presents itself throughout the length of the cutter bar. As far as is known, no special structures have been made in an attempt to solve this problem generally.

Accordingly, it is the principal object of this invention to provide a novel mowing machine cutter bar and knife assembly that will operate substantially without clogging throughout its entire length.

It is a further object of this invention to provide a cutter bar and knife assembly wherein at least one knife section passes entirely through each guard on each reciprocation of the knife.

It is a still further object of this invention to provide a knife having at least one section that passes entirely through each guard.

It is still another object of this invention to provide such a cutter bar and knife assembly that can be adapted to present mowing machine structure with a minimum of alteration and, hence, at minimum cost.

To the accomplishment of the foregoing and related ends, this invention then comprises the features hereinafter fully described and particularly pointed out in the claims, the following description setting forth in detail certain illustrative embodiments of the invention, these being indicative, however, of but a few of the various ways in which the principles of the invention may be employed.

The invention is illustrated by the accompanying drawings in which the same numerals refer to corresponding parts and in which:

FIGURE 1 is a fragmentary plan view of one form of the invention; broken lines illustrate continuation of repeated structures and hidden parts;

FIGURE 2 is a view similar to FIGURE 1 and drawn to the same scale but showing the mower equipped with Lespedeza guards;

FIGURE 3 is a schematic representation, greatly enlarged, of the first three guard locations and the first five sections to the right of the inside shoe in FIGURE 2;

FIGURE 4 is a similar view to FIGURE 3 and to the same scale but with the knife sections moved, as they would be in the process of operation;

FIGURE 5 is a plan view of two guards side by side with dotted line representation of the sections of this invention; this figure being drawn to a larger scale than FIGURES 1 and 2.

In FIGURES 1 and 2, the portions of a mowing machine that provide the setting for the structure of this invention may be listed as the cutter bar frame 10, the inner shoe 11, the outer shoe 12, the pitman 14, and knife hold-down elements 15. The guards designated 16 in FIGURE 1 but 16A in FIGURE 2 are both conventional in form. Those in FIGURE 1 designated 16 are what are known as standard or ordinary guards while those shown in FIGURE 2 and designated 16A are what are known as Lespedeza guards. Regular guards such as those designated 16 in FIGURE 1 are three inches between points in a conventional mower while the Lespedeza guards are only spaced one and one half inches between points. In both FIGURES 1 and 2 structure has been deleted which does not aid in illustrating the novelty of the structure of this invention but which would have obscured the structure desired to be shown. The knife for the cutter bar in both FIGURES 1 and 2 consists of a sickle bar which is underneath the sections 17 and not shown and to which all the sections are secured by rivets such as those designated 18 shown illustratively on a few of the sections. It will be understood that all the sections are similarly riveted without it being shown in each case. A head member 19, similar to any mower head, is the means for attaching the knife to a pitman 14 in order to produce reciprocating mowing action of the knife. The showing in FIGURE 1 illustrates the position of the knife relative to the cutter bar when the knife is at the extreme throw outward. In FIGURE 2 the reverse position or the extreme inward throw of the knife is illustrated. As may be seen in both FIGURES 1 and 2, each guard always has a section point aligned with it at the end of a stroke. As shown in FIGURE 1, also, it is the section second from the outboard end of the knife that aligns with the outboard guard 12 at the extreme outboard throw of the knife.

In order to illustrate and describe easily the difference in interaction between the guards and the knife sections, reference is made to FIGURES 3 and 4 which are enlarged schematic representations of the first three guards and five sections at the inside end of the knife in FIGURE 2. In each of these figures the guard points will be designated individually as 20, 21, and 22, reading from left to right. The sections of this invention will be designated 24, 25, 26, 27, and 28, from left to right respectively. In FIGURE 1 the first five sections on the inside end of the knife have been numbered 24A, 25A, 26A, 27A, and 28A. These correspond to sections 24, 25, 26, 27, and 28 in FIGURE 2, and the first guard to the right of the shoe 11 in FIGURE 1 is designated 21A which is equivalent in position to guard 21 in FIGURE 2. In this manner, a direct comparison between the enlarged illustrations in FIGURES 3 and 4 may be made with FIGURES 1 and 2. A fourth guard in FIGURE 2 is designated 23 although not depicted in FIGURES 3 and 4, similarly the second guard to the right of the inner shoe 11 in FIGURE 1 is designated 23A as it corresponds in location to guard 23 in FIGURE 2.

As shown in FIGURES 2 and 3, the cutter bar is positioned with the knife at the extreme inward throw of its stroke. It can be seen that sections 26, 27, and 28 align with the three guards 20, 21, and 22, respectively. As shown in FIGURE 4, the blades 24, 25, and 26 will be seen to be aligned with guards 20, 21, and 22, respectively. It will be seen therefore that while section 26 changes its alignment from guard 20 to guard 22 it passes entirely through guard 21. In a similar manner section 27 passes entirely through guard 22 and section 25 passes entirely through 20. Thus each and every guard has a section passing entirely through it. Using Lespedeza guards with a usual three inch mower section known prior to this invention, however, provides only a knife section passing entirely through every other guard. On the other hand, using the narrow sections of this invention, each guard has a knife section passing through it on each stroke of the knife.

Using FIGURES 3 and 4 in order to illustrate also the difference in action between the mower of this invention and a prior one when regularly spaced guards are used, imagine that guards 20 and 22 are not present and that guard 21 represents a single standard guard. It can be seen in FIG. 3 that the section of this invention numbered 27 is aligned with guard 21. At the end of one stroke, FIGURE 4, it will be seen that section 25 of this invention is aligned with guard 21. On the other hand, in the process of moving the knife far enough to switch from the knife section 27 to knife section 25, knife section 26 necessarily passes entirely through guard 21. While this action has been illustrated here with regard to a single guard, it is readily apparent that guard 23A in FIGURE 1 would have section 28A pass through it on an inward stroke of the knife, and in FIGURE 2, section 28 would pass through guard 23 on an outward stroke. Guards and knives for the entire length of the device would provide a similar comparison. Thus when the narrow sections of the invention are employed, each guard, whether standard or Lespedeza guards, has a section pass entirely through it on each stroke of the knife. This reaction between the knife and cutter bar just explained is one that could not be achieved by simply making double blades or W-shaped sections, as has been proposed. Such sections could not be adjusted to have section points align with guards at the end of strokes. Even if double sections could be used successfully, the cost of constructing them is prohibitive except in special circumstances.

The number of knife sections in the device of the invention is twice the number of knives previously used in a mower of comparable size and desirably plus one additional section. Since there is an additional section of the invention at each end of what would be the cutter knife as previously constructed, it is clear that the number of sections of this invention in its most desirable form, is twice plus one the number of sections on a comparable sized previously known mower bar. Effectively the sickle bar of the invention is longer than a sickle bar provided previously for a given mower by an amount that is 50% of the width of a prior three inch section although it is actually physically longer by only 25% of the width of a prior 3 inch section. To adapt any mowing machine to the use of this invention, therefore, it is necessary only to provide a special knife including the sickle bar, head, and sections.

As can be seen in FIGURE 3, the narrow sections have shorter cutting blade portions than do three inch sections. The total amount of cutter section blade that is exposed for mowing, however, is the same for the small sections of this invention and three inch sections, as is illustrated in FIGURE 5.

In that figure the guard elements 36 are seen to be provided with laterally extending lugs 37. It will be seen that these lugs are positioned toward the front ends of the guards from their bases. The lugs engage each other which means that materials to be mowed cannot get back beyond the front face of the lugs. Dotted line sections 38, which are the sections of the invention, have blade portions 39 that terminate near lugs 37 yet provide cutting blades to cut all materials that engage the lugs. The longer blade of the three inch section is no advantage, since materials being mowed cannot get back beyond guard lugs 37 in any event. Thus there is no loss of cutting power with the sections of this invention while the longer shoulders 31 and 32 provide a greater surface for the two sections to present to each other for lateral stability. In fact, since the blade portion exposed for cutting of each narrow section is equal to that of a three inch blade and there are twice as many narrow blades, cutting power is actually doubled. While it may not appear clearly so from the drawings, the shoulders as at 31 and 32 of the sections of this invention are about a third longer or more than 30% longer than the comparable shoulders of a three inch previously used section.

It is apparent that many modifications and variations of this invention as hereinbefore set forth may be made without departing from the spirit and scope thereof. The specific embodiments described are given by way of example only and the invention is limited only by the terms of the appended claims.

What is claimed is:

1. A knife for a common conventional mowing machine structure having a cutter bar with guards spaced 3 inches on centers and having an end guard at the outboard end thereof; said knife comprising: a sickle bar; sections, having points, secured to said sickle bar; said sections being symmetrical and when secured to said sickle bar having their points spaced 1½ inches on centers; said sickle bar and sections being constructed and arranged such that, when mounted in a conventional common mowing machine and properly timed thereto, the section second from the outboard end of the sickle bar aligns with the outboard guard of the mowing machine when said sickle bar is at the outer extremity of its stroke.

2. A mowing machine having a cutter bar with guards thereon spaced substantially three inches on centers and having an outboard guard; a sickle bar reciprocally mounted on said cutter bar, a plurality of sections secured to said sickle bar; said sections being symmetrical in shape, having points, and of such size that when secured to said sickle bar the points thereof are spaced substantially 1½ inches apart; means for reciprocating said sickle bar three inches on said cutter bar to an extreme outboard stroke such that the section second from the outboard end of the sickle bar aligns with the outboard guard of said mowing machine.

3. The mowing machine of the preceding claim in which Lespedeza guards are employed instead of regular guards.

References Cited in the file of this patent

UNITED STATES PATENTS

| 27,323 | Vertrus | Feb. 28, 1860 |
| 78,460 | Lewis | June 2, 1868 |
| 146,804 | Collins | Jan. 27, 1874 |
| 219,251 | Green | Sept. 2, 1879 |
| 273,994 | Hyle | Mar. 13, 1883 |
| 448,567 | Wilson | Mar. 17, 1891 |
| 2,095,608 | Lervold | Oct. 12, 1937 |
| 2,138,305 | Null | Nov. 29, 1938 |
| 2,217,741 | Gillette | Oct. 15, 1940 |

FOREIGN PATENTS

| 25,895 | Netherlands | Jan. 15, 1932 |